United States Patent
Kim et al.

(10) Patent No.: US 9,295,012 B2
(45) Date of Patent: Mar. 22, 2016

(54) TERMINAL DEVICE FOR CONTROLLING UPLINK SIGNAL TRANSMISSION POWER, AND METHOD THEREFOR

(71) Applicant: LG ELECTRONICS INC., Seoul (KR)

(72) Inventors: Dongcheol Kim, Anyang-si (KR);
Seunghee Han, Anyang-si (KR);
Hangyu Cho, Anyang-si (KR);
Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 14/241,038

(22) PCT Filed: Sep. 21, 2012

(86) PCT No.: PCT/KR2012/007584
§ 371 (c)(1),
(2) Date: Feb. 25, 2014

(87) PCT Pub. No.: WO2013/042980
PCT Pub. Date: Mar. 28, 2013

(65) Prior Publication Data
US 2014/0348078 A1    Nov. 27, 2014

Related U.S. Application Data

(60) Provisional application No. 61/537,066, filed on Sep. 21, 2011, provisional application No. 61/540,522, filed on Sep. 28, 2011.

(51) Int. Cl.
*H04W 52/32* (2009.01)
*H04W 52/34* (2009.01)
(Continued)

(52) U.S. Cl.
CPC .......... *H04W 52/325* (2013.01); *H04W 52/146* (2013.01); *H04W 52/34* (2013.01);
(Continued)

(58) Field of Classification Search
None
See application file for complete search history.

(56) References Cited

U.S. PATENT DOCUMENTS

2011/0280206 A1* 11/2011 Johansson et al. ............ 370/329
2013/0058315 A1* 3/2013 Feuersanger et al. ......... 370/336

FOREIGN PATENT DOCUMENTS

JP    2003008506    1/2003
WO    2010/008859    1/2010
(Continued)

OTHER PUBLICATIONS

Panasonic, "Comparison of Uplink Time Alignment Synchronization methods for SCell TA groups," 3GPP TSG-RAN WG2 Meeting #75, R2-113832, Aug. 2011, 7 pages.
PCT International Application No. PCT/KR2012/007584, Written Opinion of the International Searching Authority dated Mar. 29, 2013, 10 pages.

(Continued)

*Primary Examiner* — Ashley Shivers
(74) *Attorney, Agent, or Firm* — Lee, Hong, Degerman, Kang & Waimey

(57) ABSTRACT

Embodiments of the present invention relate to a method and terminal device for controlling uplink transmission power. According to one embodiment, in which a terminal that communicates with cells of each timing alignment (TA) group controls uplink transmission power in the event a plurality of TA groups including one or more cells exists in a wireless communication system, a method includes: determining the uplink transmission power for at least one channel in the event at least two channels from among a physical uplink control channel (PUCCH), a physical uplink shared channel (PUSCH) including a plurality of pieces of uplink control information (UCI), a PUSCH including no UCI, a physical random access channel (PRACH), and a sounding reference signal (SRS) are simultaneously transmitted in the same subframe in each specific cell of the plurality of TA groups. The uplink transmission power is determined in consideration of a TA group index.

14 Claims, 9 Drawing Sheets

(51) Int. Cl.
  H04W 52/36 (2009.01)
  H04W 52/50 (2009.01)
  H04W 52/14 (2009.01)
  H04L 5/00 (2006.01)
  H04W 56/00 (2009.01)

(52) U.S. Cl.
  CPC .......... *H04W52/346* (2013.01); *H04W 52/367* (2013.01); *H04W 52/50* (2013.01); *H04L 5/001* (2013.01); *H04L 5/0053* (2013.01); *H04W 56/0045* (2013.01)

(56) References Cited

FOREIGN PATENT DOCUMENTS

| WO | 2010107907 | 9/2010 |
|---|---|---|
| WO | 2010/121708 | 10/2010 |
| WO | 2011084005 | 7/2011 |

OTHER PUBLICATIONS

PCT International Application No. PCT/KR2012/007584, Written Opinion of the International Searching Authority dated Mar. 29, 2013, 12 pages.
European Patent Office Application Serial No. 12833650.0, Search Report dated Apr. 8, 2015, 6 pages.
Nokia Siemens Networks, et al., "Introduction of parallel PRACH and PUSCH/PUCCH/SRS transmission," 3GPP TSG-RAN Meeting #79, RP-121350, Sep. 2012, 3 pages.
Renesas Mobile Europe, "Open issues for RACH based solution," 3GPP TSG-RAN WG2 Meeting #75, R2-114306, Aug. 2011, 4 pages.
ZTE, "Multiple Timing Advance related issues," 3GPP TSG-RAN WG1 #66, R1-112707, Aug. 2011, 3 pages.
LG Electronics, "Aspect on Simultaneous Transmission of PRACH and UL Channels considering Multiple Timing Advance," 3GPP TSG RAN WG1 Meeting #67, R1-113910, Nov. 2011, 5 pages.
Alcatel-Lucent, et al., "Multiple Timing Advances for Carrier Aggregation," 3GPP TSG RAN WG1 Meeting #66bis, R1-113314, Oct. 2011, 4 pages.

* cited by examiner (a)

(b)

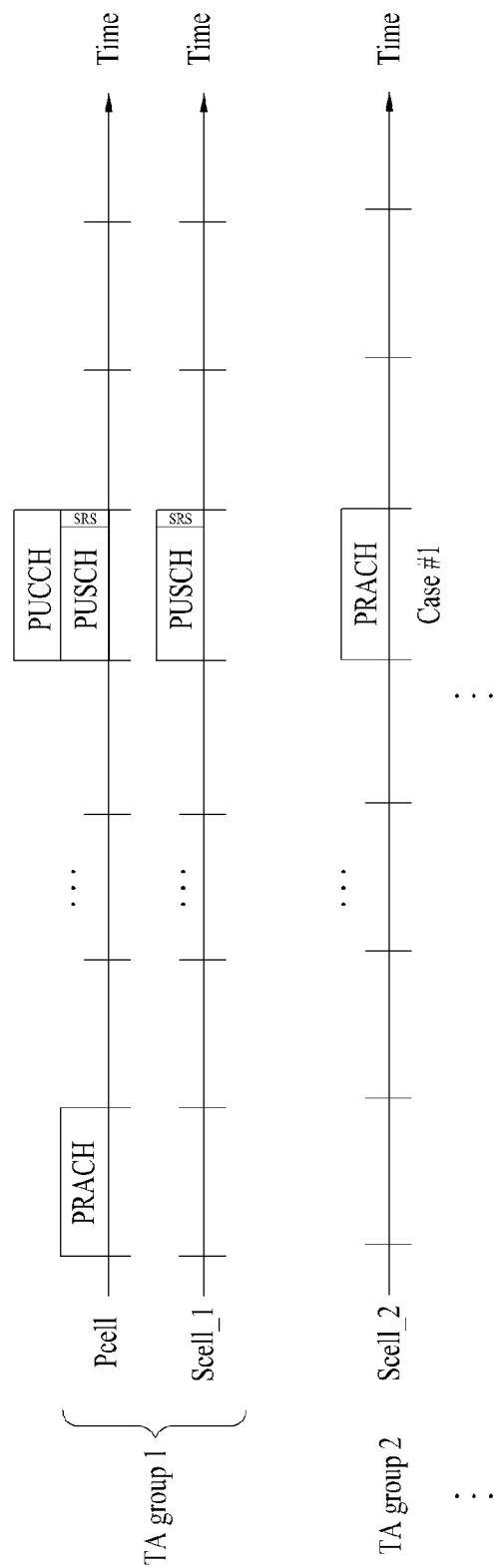

TERMINAL DEVICE FOR CONTROLLING UPLINK SIGNAL TRANSMISSION POWER, AND METHOD THEREFOR

CROSS-REFERENCE TO RELATED APPLICATIONS

This application is the National Stage filing under 35 U.S.C. 371 of International Application No. PCT/KR2012/007584, filed on Sep. 21, 2012, which claims the benefit of U.S. Provisional Application Ser. Nos. 61/540,522, filed on Sep. 28, 2011, and 61/537,066, filed on Sep. 21, 2011, the contents of which are all hereby incorporated by reference herein in their entirety.

TECHNICAL FIELD

Embodiments of the present invention relate to a wireless communication system supporting carrier aggregation (CA) (or multiple cells), and more particularly to a method and apparatus for controlling transmit (Tx) power in a wireless communication system.

BACKGROUND ART

The most important requirement of a next-generation wireless access system is to support a high data transfer rate. To achieve this, various technologies such as Multiple Input Multiple Output (MIMO), Cooperative Multiple Point Transmission (CoMP), relay, etc. have been developed and studied.

Although downlink and uplink bandwidths are different, a conventional wireless communication system typically uses one carrier. For example, a wireless communication system having one carrier for each of downlink and uplink and symmetry between downlink and uplink bandwidths may be provided based on a single carrier.

However, in order to guarantee a broadband bandwidth capable of satisfying a higher data transfer rate considering that frequency resources are saturated, carrier aggregation (CA)/multiple cells technology has been proposed, which is designed for each bandwidth to satisfy basic requirements capable of operating an independent system and aggregates a plurality of bandwidths using a single system.

In this case, a bandwidth-based carrier capable of being independently operated may be referred to as a component carrier (CC). In order to support increased transmission capacity, a bandwidth of the latest 3GPP LTE-A or 802.16m has been continuously extended up to 20 MHz or more. In this case, one or more component carriers (CCs) are aggregated to support a broadband. For example, provided that one CC supports a bandwidth of 5 MHz, 10 MHz or 20 MHz, a maximum of 5 CCs are aggregated to support a system bandwidth of up to 100 MHz.

DISCLOSURE

Technical Problem

An object of the present invention is to provide a method and apparatus for supporting uplink power control to be considered in a carrier aggregation (CA) situation including multiple timing adjustments (TAs).

Another object of the present invention is to provide a mobile station (MS) for controlling a transmit (Tx) power.

Technical Solution

In order to solve the above-mentioned technical subject matters of the present invention, a method for allowing a mobile station (MS) to control transmit (Tx) power in a wireless communication system includes considering a TA group.

The object of the present invention can be achieved by providing a method for controlling uplink (UL) transmit (Tx) power of a mobile station (MS) communicating with cells of each of a plurality of timing alignment (TA) groups when the plural TA groups each including one or more cells are present in a wireless communication system includes: if at least two channels from among a physical uplink control channel (PUCCH), a physical uplink shared channel (PUSCH) including plural uplink control information (UCI), a PUSCH including no UCI, a physical random access channel (PRACH), and a sounding reference signal (SRS) are simultaneously transmitted in the same subframe, determining uplink transmit (Tx) power of the at least one channel; and transmitting the at least one channel with the determined uplink transmit (UL Tx) power, wherein the uplink transmit (UL Tx) power is determined in consideration of a timing alignment (TA) group index.

If the PRACH, the PUCCH, the PUSCH, and the SRS are contained in different TA groups and transmitted in different secondary cells (SCells), the PRACH may have the highest transmission (Tx) priority.

If a cell for PUCCH and PUSCH transmission and a cell for PUSCH transmission are contained in a first TA group (TA group 1) and a cell for PRACH transmission is contained in a second TA group (TA group 2), PRACH transmission (Tx) power of the cell contained in the second TA group (TA group 2) may be controlled by the following equation A:

$$P_{PRACH}(i) = \min\begin{Bmatrix} P_{CMAX,c}(i), \\ \text{PREAMBLE\_RECEIVED\_TARGET\_POWER} + \\ PL_c + \Delta P_{Ramp\text{-}Up\_for\_reference\_TA\_group} \end{Bmatrix}$$ [Equation A]

$[dBm]$ where, c is a specific cell index, i is a subframe index, $P_{CMAX,c}(i)$ is maximum transmit (Tx) power capable of being transmitted by a mobile station (MS), PREAMBLE_RECEIVED_TARGET_POWER is reception (Rx) power of a RACH preamble, $PL_c$ is a downlink (DL) pathloss estimation value of a mobile station (MS) of a specific cell index (c), $\Delta P_{Ramp\text{-}Up\_for\_reference\_TA\_group}$ is total ramp-up power ranging from a first preamble used in a reference TA group to the last preamble.

PREAMBLE_RECEIVED_TARGET_POWER$_{TA\_group\_index}$ for each TA group may be applied to the PREAMBLE_RECEIVED_TARGET_POWER shown in the Equation A.

PREAMBLE_RECEIVED_TARGET_POWER$_{TA\_group\_index}$ may be signaled by at least one of a higher layer, a TA-group-specific value, and a UE-specific value.

If a cell for PUCCH and PUSCH transmission and a cell for PUSCH transmission are contained in a first TA group (TA group 1) and a cell for PRACH transmission is contained in a second TA group (TA group 2), PUCCH transmission (Tx) power of the cell contained in the first TA group (TA group 1) may be controlled by the following equation B:

$$P_{PUCCH}(i) = \min\begin{Bmatrix} 10\log_{10}(\hat{P}_{CMAX,c}(i) - \hat{P}_{PRACH}(i)), \\ P_{0\_PUCCH} + PL_c + h(n_{CQI}, n_{HARQ}, n_{SR}) + \\ \Delta_{F\_PUCCH}(F) + \Delta_{T \times D}(F') + g(i) \end{Bmatrix} [dBm] \quad \text{[Equation B]}$$

where, c is a specific cell index, i is a subframe index, $P_{PUCCH}(i)$ is PUCCH transmit (Tx) power at a subframe index (i) of the specific cell index (c), $P_{CMAX,C}(i)$ is a maximum transmit (Tx) power capable of being transmitted by a mobile station (MS), $\hat{P}_{CMAX,c}(i)$ is a linear value of $P_{CMAX,c}(i)$, $\hat{P}_{PRACH}(i)$ is a linear value of RACH transmit (Tx) power $P_{PUCCH}(i)$ at the subframe index (i), $P_{O\_PUSCH,c}(j)$ is a parameter composed of the sum of a cell-specific nominal component $P_{O\_NOMINAL\_PUSCH,c}(j)$ provided from a higher layer of a specific cell index (c) and a UE-specific component $P_{O\_UE\_PUSCH,c}(j)$ provided from a higher layer, $\alpha_c(j)$ is a cell-specific parameter, $PL_c$ is a downlink (DL) pathloss estimation value calculated in units of dB by a mobile station (MS) of a specific cell index (c), $h(n_{CQI}, n_{HARQ}, n_{SR})$ is dependent upon a PUCCH format, $n_{CQI}$ is the number of information bits of channel quality information (CQI), $n_{HARQ}$ is the number of HARQ bits, $n_{SR}$ is a value indicating whether a specific subframe includes a transport block (TB) of PUSCH, $\Delta_{F\_PUCCH}(F)$ is a relative value of PUCCH format 1a, g(i) is a value indicating a current PUCCH power control adjustment state of a subframe (i), $\Delta_{T \times D}(F')$ is decided by a higher layer in which each PUCCH format F' is defined when PUCCH is transmitted through two antenna ports and is configured by the mobile station (MS).

If a cell for PUCCH and PUSCH transmission and a cell for PUSCH transmission are contained in a first TA group (TA group 1) and a cell for PRACH transmission is contained in a second TA group (TA group 2), PUSCH transmission (Tx) power of a cell which does not perform simultaneous transmission together with PUCCH contained in the first TA group (TA group 1) may be controlled by the following equation C:

$$P_{PUSCH,c}(i) = \min\begin{Bmatrix} 10\log_{10}(\hat{P}_{CMAX,c}(i) - \hat{P}_{PRACH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{[Equation C]}$$

where, c is a specific cell index, i is a subframe index, $P_{PUCCH}(i)$ is PUCCH transmit (Tx) power at a subframe index (i) of the specific cell index (c), $P_{CMAX,C}(i)$ is a maximum transmit (Tx) power capable of being transmitted by a mobile station (MS), $\hat{P}_{CMAX,c}(i)$ is a linear value of $P_{CMAX,c}(i)$, $\hat{P}_{PRACH}(i)$ is a linear value of RACH transmit (Tx) power $P_{PUCCH}(i)$ at the subframe index (i), $M_{PUSCH,c}(i)$ is a parameter indicating a PUSCH resource allocation bandwidth represented by the number of valid resource blocks in association with the subframe (i) of the specific cell index (c), $P_{O\_PUSCH,c}(j)$ is a parameter composed of the sum of a cell-specific nominal component $P_{O\_NOMINAL\_PUSCH,c}(j)$ received from a higher layer of the specific cell index (c) and a UE-specific component $P_{O\_UE\_PUSCH,c}(j)$ received from a higher layer, $\alpha_c(j)$ is a cell-specific parameter, $PL_c$ is a downlink (DL) pathloss estimation value calculated in units of dB by a mobile station (MS) of a specific cell index (c), $f_c(i)$ is a value indicating a current PUSCH power control adjustment state in association with the subframe index (i) of the specific cell index (c), and $\Delta_{TF,c}(i)$ is a value associated with one codeword of the specific cell index (c).

If a cell for PUCCH and PUSCH transmission and a cell for PUSCH transmission are contained in a first TA group (TA group 1) and a cell for PRACH transmission is contained in a second TA group (TA group 2), PUSCH transmission (Tx) power of a cell performs simultaneous transmission together with PUCCH contained in the first TA group (TA group 1) is controlled by the following equation D:

$$P_{PUSCH,c}(i) = \min\begin{Bmatrix} 10\log_{10}(\hat{P}_{CMAX,c}(i) - \hat{P}_{PRACH}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{[Equation D]}$$

where, c is a specific cell index, i is a subframe index, $P_{PUCCH}(i)$ is PUCCH transmit (Tx) power at a subframe index (i) of the specific cell index (c), $P_{CMAX,C}(i)$ is a maximum transmit (Tx) power capable of being transmitted by a mobile station (MS), $\hat{P}_{CMAX,c}(i)$ is a linear value of $P_{CMAX,c}(i)$, $\hat{P}_{PRACH}(i)$ is a linear value of RACH transmit (Tx) power $\hat{P}_{PUCCH}(i)$ at the subframe index (i), $M_{PUSCH,c}(i)$ is a parameter indicating a PUSCH resource allocation bandwidth represented by the number of valid resource blocks in association with the subframe (i) of the specific cell index (c), $\hat{P}_{PUCCH,c}(i)$ is a linear value of PUCCH transmit (Tx) power, $P_{O\_PUSCH,c}(j)$ is a parameter composed of the sum of a cell-specific nominal component $P_{O\_NOMINAL\_PUSCH,c}(j)$ received from a higher layer of the specific cell index (c) and a UE-specific component $P_{O\_UE\_PUSCH,c}(j)$ received from a higher layer, $\alpha_c(j)$ is a cell-specific parameter, $PL_c$ is a downlink (DL) pathloss estimation value calculated in units of dB by a mobile station (MS) of a specific cell index (c), $f_c(i)$ is a value indicating a current PUSCH power control adjustment state in association with the subframe index (i) of the specific cell index (c), and $\Delta_{TF,c}$ is a value associated with one codeword of the specific cell index (c).

In accordance with another aspect of the present invention, a mobile station (MS) for controlling uplink (UL) transmit (Tx) power of a mobile station (MS) communicating with cells of each of a plurality of timing alignment (TA) groups when the plural TA groups each including one or more cells are present in a wireless communication system includes: a processor, if at least two channels from among a physical uplink control channel (PUCCH), a physical uplink shared channel (PUSCH) including plural uplink control information (UCI), a PUSCH including no UCI, a physical random access channel (PRACH), and a sounding reference signal (SRS) are simultaneously transmitted in the same subframe, for determining uplink transmit (Tx) power of the at least one channel; and a transmitter for transmitting the at least one channel with the determined uplink transmit (UL Tx) power, wherein the uplink transmit (UL Tx) power is determined in consideration of a timing alignment (TA) group index.

If the PRACH, the PUCCH, the PUSCH, and the SRS are contained in different TA groups and transmitted in different secondary cells (SCells), the PRACH may have the highest transmission (Tx) priority.

If a cell for PUCCH and PUSCH transmission and a cell for PUSCH transmission are contained in a first TA group (TA group 1) and a cell for PRACH transmission is contained in a second TA group (TA group 2), PRACH transmission (Tx) power of the cell contained in the second TA group (TA group 2) may be controlled by the following equation A:

$$P_{PRACH}(i) = \quad \text{[Equation A]}$$

$$\min \begin{Bmatrix} P_{CMAX,c}(i), \\ \text{PREAMBLE\_RECEIVED\_TARGET\_POWER} + \\ PL_c + \Delta P_{Ramp\text{-}Up\_for\_reference\_TA\_group} \end{Bmatrix} [dBm]$$

where, c is a specific cell index, i is a subframe index, $P_{CMAX,c}(i)$ is maximum transmit (Tx) power capable of being transmitted by a mobile station (MS), PREAMBLE_RECEIVED_TARGET_POWER is reception (Rx) power of a RACH preamble, $PL_c$ is a downlink (DL) pathloss estimation value of a mobile station (MS) of a specific cell index (c), $\Delta P_{Ramp\text{-}Up\_for\_reference\_TA\_group}$ is total ramp-up power ranging from a first preamble used in a reference TA group to the last preamble.

PREAMBLE_RECEIVED_TARGET_POWER$_{TA\_group\_index}$ for each TA group may be applied to the PREAMBLE_RECEIVED_TARGET_POWER shown in the Equation A.

PREAMBLE_RECEIVED_TARGET_POWER$_{TA\_group\_index}$ may be signaled by at least one of a higher layer, a TA-group-specific value, and a UE-specific value.

If a cell for PUCCH and PUSCH transmission and a cell for PUSCH transmission are contained in a first TA group (TA group 1) and a cell for PRACH transmission is contained in a second TA group (TA group 2), PUCCH transmission (Tx) power of the cell contained in the first TA group (TA group 1) may be controlled by the following equation B:

$$P_{PUCCH}(i) = \quad \text{[Equation B]}$$

$$\min \begin{Bmatrix} 10\log_{10}(\hat{P}_{CMAX,c}(i) - \hat{P}_{PRACH}(i)), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{Bmatrix} [dBm]$$

where, c is a specific cell index, i is a subframe index, $P_{PUCCH}(i)$ is PUCCH transmit (Tx) power at a subframe index (i) of the specific cell index (c), $P_{CMAX,c}(i)$ is a maximum transmit (Tx) power capable of being transmitted by a mobile station (MS), $\hat{P}_{CMAX,c}(i)$ is a linear value of $P_{CMAX,c}(i)$, $\hat{P}_{PRACH}(i)$ is a linear value of RACH transmit (Tx) power $P_{PUCCH}(i)$ at the subframe index (i), $P_{O\_PUSCH,c}(j)$ is a parameter composed of the sum of a cell-specific nominal component $P_{O\_NOMINAL\_PUSCH,c}(j)$ provided from a higher layer of a specific cell index (c) and a UE-specific component $P_{O\_UE\_PUSCH,c}(j)$ provided from a higher layer, $\alpha_c(j)$ is a cell-specific parameter, $PL_c$ is a downlink (DL) pathloss estimation value calculated in units of dB by a mobile station (MS) of a specific cell index (c), $h(n_{CQI}, n_{HARQ}, n_{SR})$ is dependent upon a PUCCH format, $N_{CQI}$ is the number of information bits of channel quality information (CQI), $n_{HARQ}$ is the number of HARQ bits, $n_{SR}$ is a value indicating whether a specific subframe includes a transport block (TB) of PUSCH, $\Delta_{F\_PUCCH}(F)$ is a relative value of PUCCH format 1a, g(i) is a value indicating a current PUCCH power control adjustment state of a subframe (i), $\Delta_{TxD}(F')$ is decided by a higher layer in which each PUCCH format F' is defined when PUCCH is transmitted through two antenna ports and is configured by the mobile station (MS).

If a cell for PUCCH and PUSCH transmission and a cell for PUSCH transmission are contained in a first TA group (TA group 1) and a cell for PRACH transmission is contained in a second TA group (TA group 2), PUSCH transmission (Tx) power of a cell which does not perform simultaneous transmission together with PUCCH contained in the first TA group (TA group 1) may be controlled by the following equation C:

$$P_{PUSCH,c}(i) = \quad \text{[Equation C]}$$

$$\min \begin{Bmatrix} 10\log_{10}(\hat{P}_{CMAX,c}(i) - \hat{P}_{PRACH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$

where, c is a specific cell index, i is a subframe index, $P_{PUCCH}(i)$ is PUCCH transmit (Tx) power at a subframe index (i) of the specific cell index (c), $P_{CMAX,c}(i)$ is a maximum transmit (Tx) power capable of being transmitted by a mobile station (MS), $\hat{P}_{CMAX,c}(i)$ is a linear value of $P_{CMAX,c}(i)$, $\hat{P}_{PRACH}(i)$ is a linear value of RACH transmit (Tx) power $P_{PUCCH}(i)$ at the subframe index (i), $M_{PUSCH,c}(i)$ is a parameter indicating a PUSCH resource allocation bandwidth represented by the number of valid resource blocks in association with the subframe (i) of the specific cell index (c), $P_{O\_PUSCH,c}(j)$ is a parameter composed of the sum of a cell-specific nominal component $P_{O\_NOMINAL\_PUSCH,c}(j)$ received from a higher layer of the specific cell index (c) and a UE-specific component $P_{O\_UE\_PUSCH,c}(j)$ received from a higher layer, $\alpha_c(j)$ is a cell-specific parameter, $PL_c$ is a downlink (DL) pathloss estimation value calculated in units of dB by a mobile station (MS) of a specific cell index (c), $f_c(i)$ is a value indicating a current PUSCH power control adjustment state in association with the subframe index (i) of the specific cell index (c), and $\Delta_{TF,c}(i)$ is a value associated with one codeword of the specific cell index (c).

If a cell for PUCCH and PUSCH transmission and a cell for PUSCH transmission are contained in a first TA group (TA group 1) and a cell for PRACH transmission is contained in a second TA group (TA group 2), PUSCH transmission (Tx) power of a cell used for simultaneous transmission together with PUCCH contained in the first TA group (TA group 1) may be controlled by the following equation D:

$$P_{PUSCH,c}(i) = \quad \text{[Equation D]}$$

$$\min \begin{Bmatrix} 10\log_{10}(\hat{P}_{CMAX,c}(i) - \hat{P}_{PRACH}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$

where, c is a specific cell index, i is a subframe index, $P_{PUCCH}(i)$ is PUCCH transmit (Tx) power at a subframe index (i) of the specific cell index (c), $P_{CMAX,c}(i)$ is a maximum transmit (Tx) power capable of being transmitted by a mobile station (MS), $\hat{P}_{CMAX,c}(i)$ is a linear value of $P_{CMAX,c}(i)$, $\hat{P}_{PRACH}(i)$ is a linear value of RACH transmit (Tx) power $P_{PUCCH}(i)$ at the subframe index (i), $M_{PUSCH,c}(i)$ is a parameter indicating a PUSCH resource allocation bandwidth represented by the number of valid resource blocks in association with the subframe (i) of the specific cell index (c), $\hat{P}_{PUCCH,c}(i)$ is a linear value of PUCCH transmit (Tx) power, $P_{O\_PUSCH,c}(j)$ is a parameter composed of the sum of a cell-specific nominal component $P_{O\_NOMINAL\_PUSCH,c}(j)$ received from a higher layer of the specific cell index (c) and a UE-specific component $P_{O\_UE\_PUSCH,c}(j)$ received from a higher layer, $\alpha_c(j)$ is a cell-specific parameter, $PL_c$ is a downlink (DL) pathloss estimation value calculated in units of dB by a mobile station (MS) of a specific cell index (c), $f_c(i)$ is a value indicating a current PUSCH power control adjustment state in association with the subframe index (i) of the specific cell index (c), and $\Delta_{TF,c}(i)$ is a value associated with one codeword of the specific cell index (c).

Advantageous Effects

According to embodiments of the present invention, according to a method for controlling Tx power, assuming that uplink signals are simultaneously transmitted to individual cells contained in a plurality of TA groups, Tx power of a mobile station (MS) can be established.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIG. 9 is a conceptual diagram illustrating a base station (BS) and RRH structure.

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE or LTE-A system, but the present invention is not limited thereto and the remaining parts of the present invention other than unique characteristics of the 3GPP LTE or LTE-A system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts. Although the embodiments of the present invention are disclosed on the basis of 3GPP LTE, LTE-A systems for convenience of description, contents of the present invention can also be applied to other communication systems.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
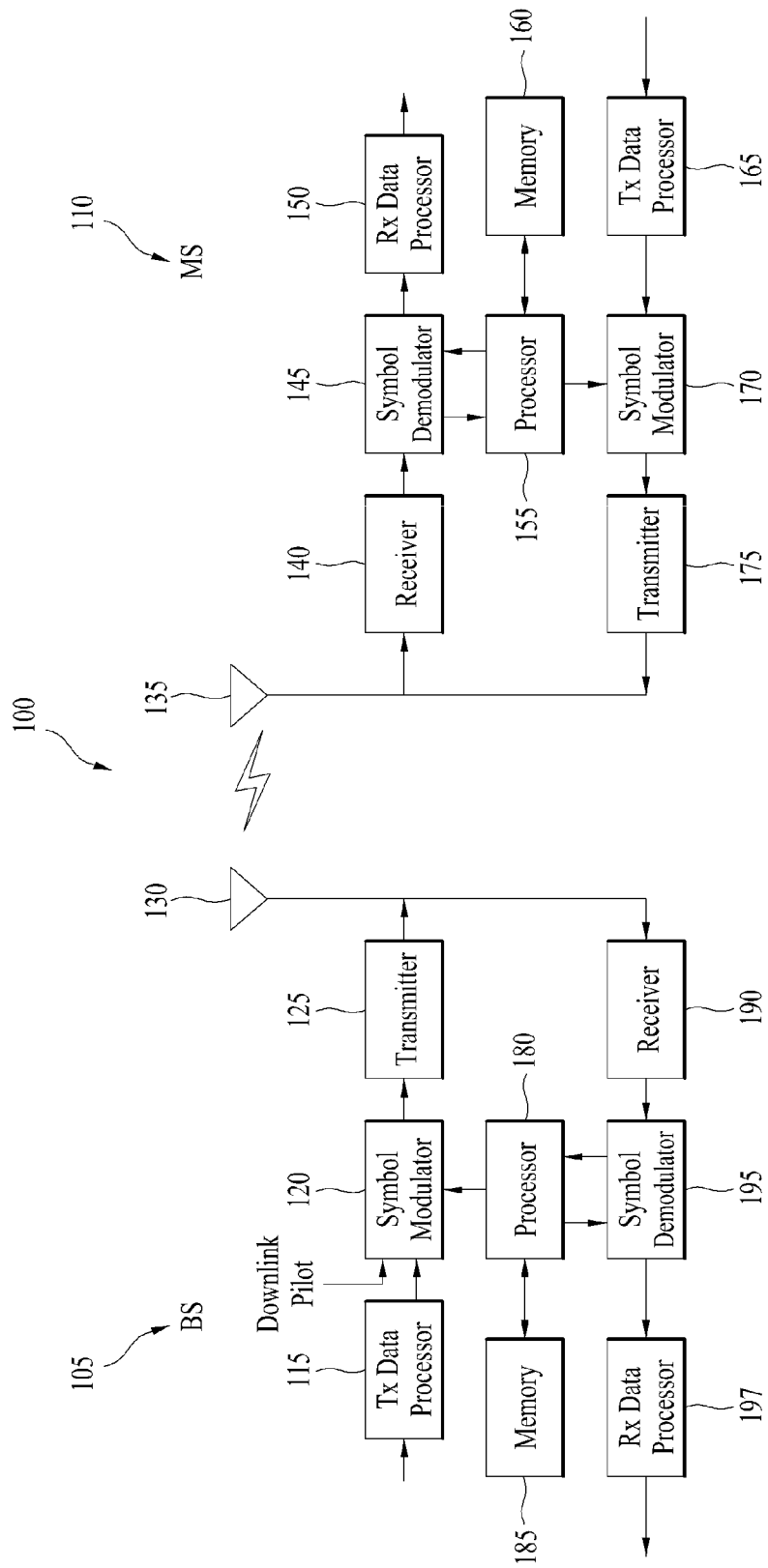
FIG. 1 is a block diagram illustrating a base station (BS) and a user equipment (UE) for use in a wireless communication system.

FIG. 1 is a block diagram illustrating a base station (BS) 105 and a mobile station (MS) 110 for use in a wireless communication system 100 according to the present invention.

Although FIG. 1 shows one BS 105 and one MS 110 for brief description of the wireless communication system 100, it should be noted that the wireless communication system 100 may further include one or more BSs and/or one or more MSs.

Referring to FIG. 1, the BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The MS 110 may include a Tx data processor 165, a symbol modulator 170, a transmitter 175, a transmission/reception antenna 135, a processor 155, a memory 160, a receiver 140, a symbol demodulator 155, and a Rx data processor 150. In FIG. 1, although one antenna 130 is used for the BS 105 and one antenna 135 is used for the MS 110, each of the BS 105 and the MS 110 may also include a plurality of antennas as necessary. Therefore, the BS 105 and the MS 110 according to the present invention support a Multiple Input Multiple Output (MIMO) system. The BS 105 according to the present invention can support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, and interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the RN through the antenna 130. The Tx antenna 130 transmits the generated DL signal to the UE.

Configuration of the MS 110 will hereinafter be described in detail. The Rx antenna 135 of the MS 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the eNB 105.

The Tx data processor 165 of the MS 110 processes traffic data in uplink, and provides data symbols. The symbol modulator 170 receives and multiplexes data symbols, and modulates the multiplexed data symbols, such that it can provide a stream of symbols to the transmitter 175. The transmitter 175 receives and processes the stream of symbols to generate an uplink (UL) signal, and the UL signal is transmitted to the BS 105 through the Tx antenna 135.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

Processor 155 or 180 of the MS 110 or the BS 105 commands or indicates operations of the MS 110 or the BS 105. For example, the processor 155 or 180 of the MS 110 or the BS 105 controls, adjusts, and manages operations of the MS 110 or the BS 105. Each processor 155 or 180 may be connected to a memory unit 160 or 185 for storing program code and data. The memory 160 or 185 is connected to the processor 155 or 180, such that it can store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the embodiments of the present invention may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 155 or 180 or the memory unit 160 or 185, such that it can be driven by the processor 155 or 180.

Radio interface protocol layers among the MS 110, the BS 105, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The MS 110 and the BS 105 may exchange RRC messages with each other through the wireless communication network and the RRC layer.

Figure 2:
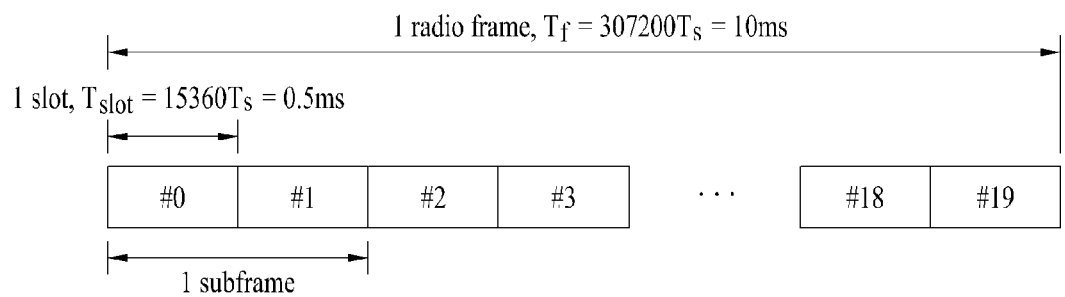
FIG. 2 is a diagram illustrating a structure of a radio frame used in a 3GPP LTE system as an exemplary mobile communication system.

FIG. 2 is a diagram illustrating a structure of a radio frame used in a 3GPP LTE system acting as a mobile communication system.

Referring to FIG. 2, the radio frame has a length of 10 ms ($327200*T_s$) and includes 10 subframes of equal size. Each subframe has a length of 1 ms and includes two slots. Each slot has a length of 0.5 ms ($15360 \times T_s$). In this case, $T_s$ represents a sampling time, and is expressed by '$T_s=1/(15 \text{ kHz}*2048)=3.2552 \times 10^{-8}$ (about 33 ns)'. The slot includes a plurality of OFDM or SC-FDMA symbols in a time domain, and includes a plurality of resource blocks (RBs) in a frequency domain.

In the LTE system, one resource block includes twelve (12) subcarriers * seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM or SC-FDMA symbols in each slot.

Figure 3:
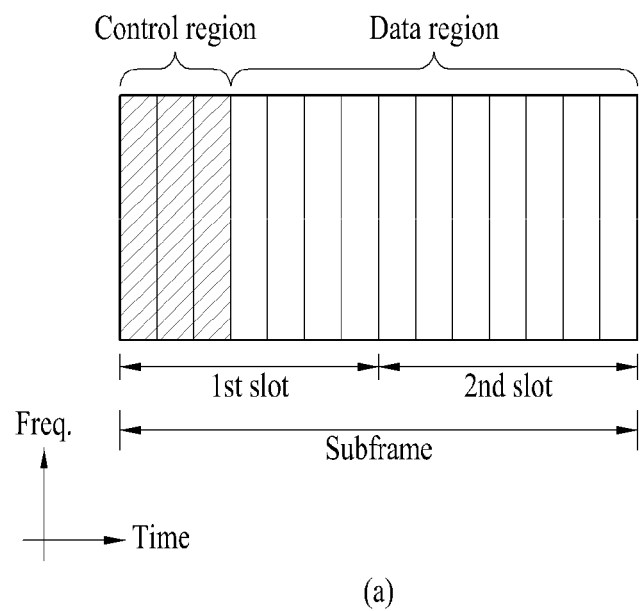
FIG. 3 is an exemplary structural diagram illustrating downlink and uplink subframes for use in a 3GPP LTE system as an exemplary mobile communication system according to the present invention.
Figure 3:
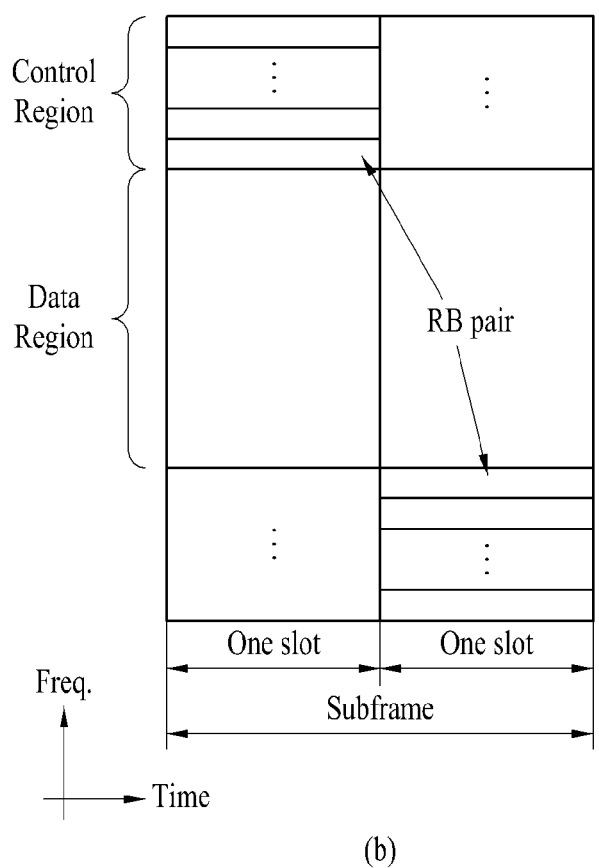

FIG. 3 is an exemplary structural diagram illustrating downlink and uplink subframes for use in a 3GPP LTE system as an exemplary mobile communication system according to the present invention.

Referring to FIG. 3A, one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channel for use in the 3GPP LTE system includes a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement) NACK (Not-Acknowledgement) signals about an UL Hybrid Automatic Repeat Request (UL HARQ). That is, the ACK/NACK signals about UL data transmitted from the UE are transmitted over PHICH.

A base station (BS) may transmit information about resource allocation and transmission format (UL grant) of the PDSCH, resource allocation information of the PUSCH, information about Voice over Internet Protocol (VoIP) activation, etc. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs.

Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

DCI format 33A includes TPC commands of a plurality of UEs. In case of DCI format 33A, the eNB is masked onto CRC. TPC-ID is an ID that is demasked by a UE that monitors a PDCCH carrying a TPC command. TPC-ID may be an ID used by a UE that decodes a PDCCH to decide transmission or non-transmission of the TPC command over the PDCCH. TPC-ID may be defined by reusing conventional IDs (i.e., C-RNTI(Radio Network Temporary Identifier), PI-RNTI, SC-RNTI, or RA-RNTI), or may be defined as a new ID. TPC-ID is an ID for UEs of a specific aggregate contained in a cell, such that it is different from C-RNTI acting as an ID of a specific UE. In addition, the TPC JD is also different from IDs (e.g., PI-RNTI, SC-RNTI and RA-RNTI) of all UEs contained in the cell. If DCI includes a TPC command for N UEs, only N UEs need to receive the TPC commands. If TPC commands for all UEs contained in the cell are contained in a DCI, the TPC-ID is used as an ID for all UEs contained in the cell.

The UE monitors an aggregate of PDCCH candidates in a search space contained in a subframe, such that it searches for TPC-ID. In this case, TPC-ID may be found either in a common search space or in a UE-specific search space. The common search space is a search space in which all UEs contained in the cell can perform the searching operation. The UE-specific search space is a search space in which a specific UE can perform the searching operation. If the CRC error is not detected by demasking a TPC-ID in the corresponding PDCCH candidate, a UE can receive a TPC command on a PDCCH.

An identifier (ID, i.e., TPC-ID) for a PDCCH carrying a plurality of TPC commands is defined. If TPC-ID is detected, the UE receives a TPC command on the corresponding PDCCH. The TPC command is used to adjust transmission (Tx) power of an uplink channel. Therefore, the TPC command can prevent data or information from being transmitted to an eNB due to wrong power control, or can also prevent interference for other UEs.

A method for allowing a BS to perform resource mapping for PDCCH transmission in the LTE system will hereinafter be described in detail.

Generally, the BS may transmit scheduling allocation information and other control information over the PDCCH. Information about a physical control channel (PCCH) is configured in the form of one aggregate (one aggregation) or several CCEs, such that the resultant information is transmitted as one aggregate or several CCEs. Namely, a PDCCH transmission unit of the eNB is a CCE. One CCE includes 9 resource element groups (REGs). The number of RBGs unallocated to either Physical Control Format Indicator Channel (PCFICH) or Physical Hybrid Automatic Repeat Request Indicator Channel (PHICH) is $N_{RBG}$. CCEs from 0 to $N_{CCE}-1$ may be available to a system (where, $N_{CCE}=\lfloor N_{REG}/9 \rfloor$). PDCCH supports multiple formats as shown in the following Table 2. One PDCCH composed of n contiguous CCEs begins with a CCE having 'i mod n=0' (where 'i' is a CCE number). Multiple PDCCHs may be transmitted through one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, an eNode B (eNB) may decide a PDCCH format according to how many regions are required for the BS to transmit control information. The UE reads control information and the like in units of a CCE, resulting in reduction of overhead.

Referring to FIG. 3(b), an uplink (UL) subframe may be divided into a control region and a data region in a frequency domain. The control region may be assigned to a Physical Uplink Control Channel (PUCCH) carrying uplink control information (UCI). The data region may be assigned to a Physical Uplink Shared Channel (PUSCH) carrying user data. In order to maintain single carrier characteristics, one UE does not simultaneously transmit PUCCH and PUSCH. PUCCH for one UE may be assigned to a Resource Block (RB) pair in one subframe. RBs of the RB pair occupy different subcarriers in two slots. The RB pair assigned to PUCCH performs frequency hopping at a slot boundary.

Figure 4:
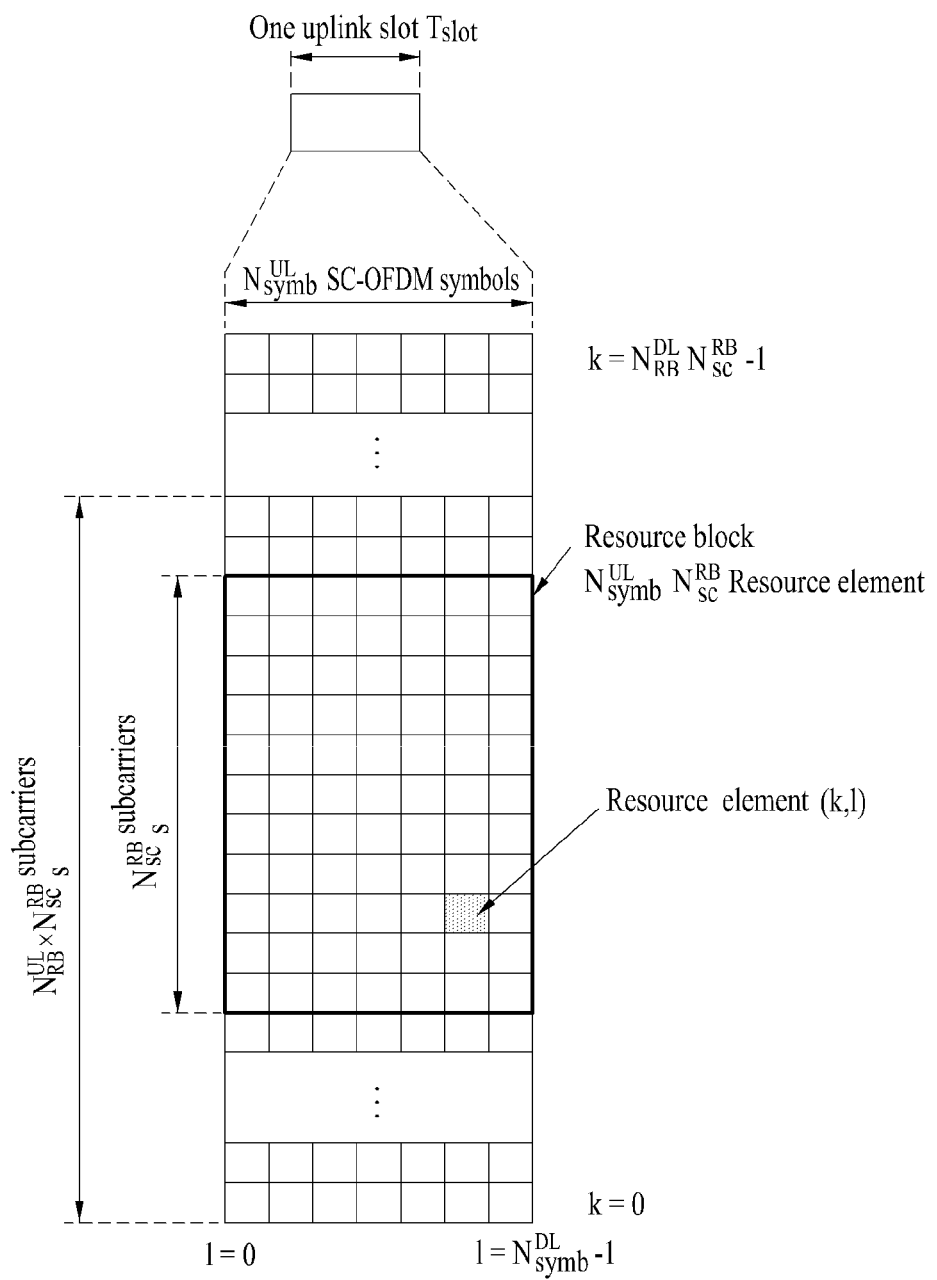
FIG. 4 shows a downlink (DL) time-frequency resource grid structure for use in a 3GPP LTE system.

FIG. 4 shows a downlink (DL) time-frequency resource grid structure for use in a 3GPP LTE system.

Referring to FIG. 4, downlink transmission resources can be described by a resource grid including $N_{RB}^{DL} \times N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. $N_{RB}^{DL}$ varies with a downlink transmission bandwidth constructed in a cell, and must satisfy $N_{RB}^{min,DL} \leq N_{RB}^{DL} \leq N_{RB}^{max,DL}$. Here, $N_{RB}^{min,DL}$ is the smallest downlink bandwidth supported by the wireless communication system, and $N_{RB}^{max,DL}$ is the largest downlink bandwidth supported by the wireless communication system. Although $N_{RB}^{min,DL}$ may be set to 6 ($N_{RB}^{min,DL}=6$) and $N_{RB}^{max,DL}$ may be set to 110 ($N_{RB}^{max,DL}=110$), the scopes of $N_{RB}^{min,UL}$ and $N_{RB}^{max,UL}$ are not limited thereto. The number of OFDM symbols contained in one slot may be differently defined according to the length of a Cyclic Prefix (CP) and spacing between subcarriers. When transmitting data or information via multiple antennas, one resource grid may be defined for each antenna port.

Each element contained in the resource grid for each antenna port is called a resource element (RE), and can be identified by an index pair (k,l) contained in a slot, where k is an index in a frequency domain and is set to any one of $0, \ldots, N_{RB}^{DL} N_{sc}^{RB} - 1$, and l is an index in a time domain and is set to any one of $0, \ldots, N_{symb}^{DL} - 1$.

Resource blocks (RBs) shown in FIG. 4 are used to describe a mapping relationship between certain physical channels and resource elements (REs). The RBs can be classified into physical resource blocks (PRBs) and virtual resource blocks (VRBs). One PRB is defined by $N_{symb}^{DL}$ consecutive OFDM symbols in a time domain and $N_{SC}^{RB}$ consecutive subcarriers in a frequency domain. $N_{symb}^{DL}$ and $N_{SC}^{RB}$ may be predetermined values, respectively. For example, $N_{symb}^{DL}$ and $N_{SC}^{RB}$ may be given as shown in the following Table 1. Therefore, one PRB may be composed of $N_{symb}^{DL} \times N_{SC}^{RB}$ resource elements. One PRB symb SC may correspond to one slot in a time domain and may also correspond to 180 kHz in a frequency domain, but it should be noted that the scope of the present invention is not limited thereto.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The PRBs are assigned numbers from 0 to $N_{RB}^{DL} - 1$ in the frequency domain. A PRB number $n_{PRB}$ and a resource element index (k,l) in a slot can satisfy a predetermined relationship denoted by $$n_{PRB} = \left\lfloor \frac{k}{N_{sc}^{RB}} \right\rfloor.$$

The VRB may have the same size as that of the PRB. The VRB may be classified into a localized VRB (LVRB) and a distributed VRB (DVRB). For each VRB type, a pair of PRBs allocated over two slots of one subframe is assigned a single VRB number $n_{VRB}$.

The VRB may have the same size as that of the PRB. Two types of VRBs are defined, the first one being a localized VRB (LVRB) and the second one being a distributed type (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

A method for allowing the BS to transmit a PDCCH to a mobile station (MS) in the LTE system will hereinafter be described in detail.

The BS determines a PDCCH format according to a DCI to be sent to the MS, and attaches a Cyclic Redundancy Check (CRC) to control information. A unique identifier (e.g., a Radio Network Temporary Identifier (RNTI)) is masked onto the CRC according to PDCCH owners or utilities. In case of a PDCCH for a specific UE, a unique ID of a mobile station (MS), for example, C-RNTI (Cell-RNTI) may be masked onto CRC. Alternatively, in case of a PDCCH for a paging message, a paging indication ID (for example, R-RNTI (Paging-RNTI)) may be masked onto CRC. In case of a PDCCH for system information (SI), a system information ID (i.e., SI-RNTI) may be masked onto CRC. In order to indicate a random access response acting as a response to a MS's random access preamble transmission, RA-RNTI (Random Access—RNTI) may be masked onto CRC. The following Table 5 shows examples of IDs masked onto PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH may carry control information for a specific UE. If another RNTI is used, PDCCH may carry common control information that is received by all or some UEs contained in the cell. The BS performs channel coding of the CRC-added DCI so as to generate coded data. The BS performs rate matching according to the number of CCEs allocated to a PDCCH format. Thereafter, the BS modulates the coded data so as to generate modulated symbols. In addition, the BS maps the modulated symbols to physical resource elements.

Figure 5:
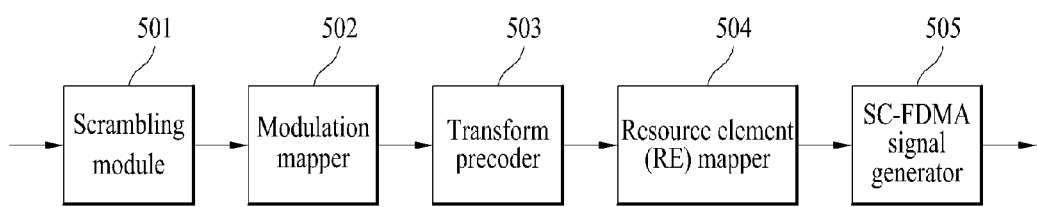
FIG. 5 is a conceptual diagram illustrating a method for processing an uplink signal by a mobile station (MS).

FIG. 5 is a conceptual diagram illustrating a method for processing an uplink signal by a mobile station (MS).

Referring to FIG. 5, the scrambling module 501 may scramble a transmission signal in order to transmit the uplink signal. The scrambled signal is input to the modulation mapper 502, such that the modulation mapper 502 modulates the scrambled signal to complex symbols in Binary Phase Shift Keying (BPSK), Quadrature Phase Shift Keying (QPSK), or 16-ary Quadrature Amplitude Modulation (16QAM)/64-ary QAM (64QAM) according to the type of the transmission signal and/or a channel status. A transform precoder 503 processes the complex symbols and a resource element mapper 504 may map the processed complex symbols to time-frequency resource elements, for actual transmission. The mapped signal may be transmitted to the BS through an antenna after being processed in a Single Carrier-Frequency Division Multiple Access (SC-FDMA) signal generator 505.

PUCCH formats defined in 3GPP LTE Rel-8 and UE uplink transmission power will hereinafter be described in detail. PUCCH is a UL control channel for carrying UL control information, and it is impossible for the LTE system to simultaneously transmit PUCCH and PUSCH due to single-carrier characteristics. However, as multiple carriers (multi-carrier) are introduced into the LTE-A system, PUCCH can be transmitted along with a PUSCH at a specific component carrier [for example, a primary component carrier (PCell)]. PUCCH supports a plurality of formats, and a PUCCH format supported by LTE Release 8 is shown in the following Table 5. In this case, PUCCH formats 2a and 2B support only a normal CP.

TABLE 5

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

In Equation 1, UL power for UL control channel transmission of a mobile station (MS) for use in LTE Release-8 is represented in units of dBm.

$$P_{PUCCH}(i)=\min\{P_{CMAX},P_{O\_PUCCH}+PL+h(n_{CQI},N_{HARQ})+\Delta_{F\_PUCCH}(F)+g(i)\}$$ [Equation 1]

In Equation 1, 'i' denotes a subframe index, and $P_{CMAX}$ denotes a maximum power capable of being transmitted by a mobile station (MS). $P_{O\_PUCCH}$ is a parameter composed of the sum of cell-specific parameters, and is notified by a BS through higher layer signaling. 'PL' is a downlink pathloss (or downlink signal-loss) estimation value calculated in units of dB by a mobile station (MS), and is denoted by PL=referenceSignalPower-higher layer filteredRSRP'. h(n) is dependent upon PUCCH format, $n_{CQI}$ is the number of bits indicating channel quality information, and $n_{HARQ}$ is the number of HARQ bits. $\Delta_{F\_PUCCH}(F)$ is a relative value for PUCCH format 1a, corresponds to PUCCH format (F), and is notified by a BS through higher layer signaling. g(j) denotes a current PUCCH power control adjustment state of a subframe (i.e., subframe(i)) having an index (i). In PUCCH formats 1, 1a, and 1b, $h(n_{CQI}, n_{HARQ})$ is set to zero (0). In the case of a normal cyclic prefix (CP) in PUCCH formats 2, 2a, 2b, $h(n_{CQI}, n_{HARQ})$ can be represented by the following equation 2.

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases}$$ [Equation 2]

Table 6 shows $\delta_{PUCCH}$ values mapped to the TPC command field in DCI formats 1A/1B/1D/1/2A/2/3, and Table 7 shows $\delta_{PUCCH}$ values mapped to the TPC command field in DCI format 3A. In this case, $\delta_{PUCCH}$ denotes a UE-specific correction value (or power correction value).

TABLE 6

| TPC Command Field in DCI format 1A/1B/1D/1/2A/2/3 | $\delta_{PUCCH}$ [dB] |
|---|---|
| 0 | −1 |
| 1 | 0 |
| 2 | 1 |
| 3 | 3 |

TABLE 7

| TPC Command Field in DCI format 3A | $\delta_{PUCCH}$ [dB] |
|---|---|
| 0 | −1 |
| 1 | 1 |

FIGS. 6A to 8B are conceptual diagrams illustrating multiple carriers of a base station (BS) and multiple carriers of a mobile station (MS).

Environments that are taken into consideration in the embodiments of the present invention include all general multicarrier resource environments. That is, the term "multi-carrier system" or "carrier aggregation system" used in the present invention refers to a system that uses an aggregation of one or more carriers having a smaller bandwidth than a target bandwidth when configuring a target wideband in order to support wideband.

When one or more carriers having a smaller bandwidth than the target bandwidth are combined (or aggregated), bandwidths of the carriers to be combined may be limited to bandwidths that are used in the conventional IMT system in order to maintain backward compatibility with the conventional IMT system. For example, the conventional 3GPP LTE system supports bandwidths of 1.4, 3, 5, 10, 15, and 20 MHz and the LTE-advanced (LTE_A) system can support a greater bandwidth than 20 MHz using only the bandwidths supported by the LTE system. In addition, the carrier aggregation (CA) system used in the present invention can also define a new bandwidth, regardless of the bandwidths used in the conventional system, to support carrier combination (i.e., carrier aggregation).

Multiple carriers are interchangeably used with carrier aggregation and bandwidth (BW) aggregation. Here, the term "carrier aggregation" is an expression including both contiguous carrier aggregation and non-contiguous carrier aggregation spectrum aggregation.

Figure 6A:
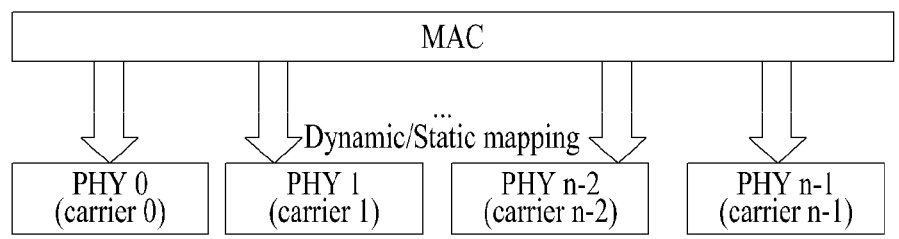
FIG. 6A is a conceptual diagram illustrating multiple carriers of a base station (BS).
Figure 6B:
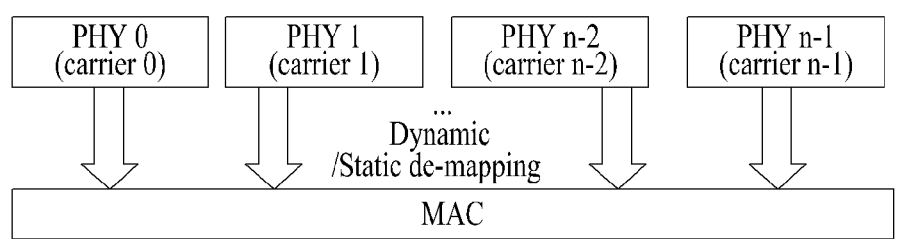
FIG. 6B is a conceptual diagram illustrating multiple carriers of a mobile station (MS).

In order to efficiently use multiple carriers, technology of managing several carriers by one MAC will be described. A transmitter is shown in FIG. 6A and a receiver is shown in FIG. 6B. At this time, in order to efficiently transmit/receive multiple carriers, both the transmitter and the receiver must transmit/receive multiple carriers.

Briefly, one MAC manages/operates and transmits/receives one or more frequency carriers. In addition, since frequency carriers managed by one MAC need not be contiguous to each other, resources are more flexibly managed in terms of resource management. Both contiguous carrier aggregation and non-contiguous carrier aggregation can be applied to the frequency carriers managed on MAC.

In addition to the structures of FIGS. 6A and 6B, as shown in FIGS. 7A, 7B, 8A and 8B, several PHY layers may control several MAC layers but not one MAC layer.

Figure 7A:
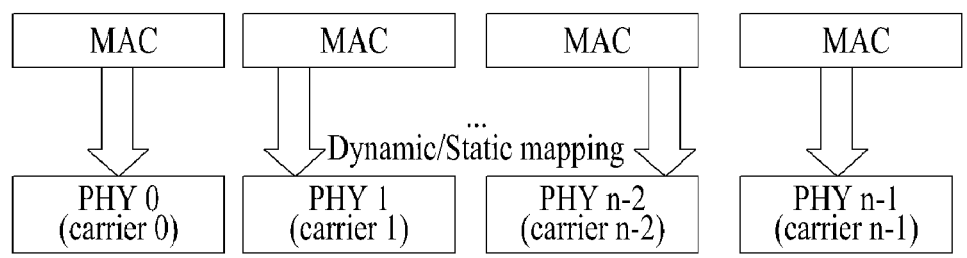
FIG. 7A is a conceptual diagram illustrating multiple carriers of a base station (BS).
Figure 7B:
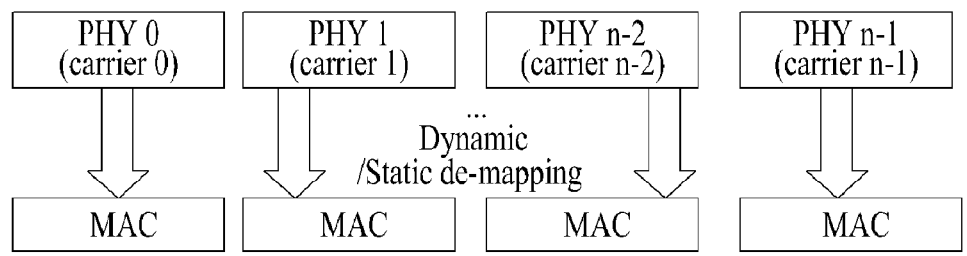
FIG. 7B is a conceptual diagram illustrating multiple carriers of a mobile station (MS).
Figure 8A:
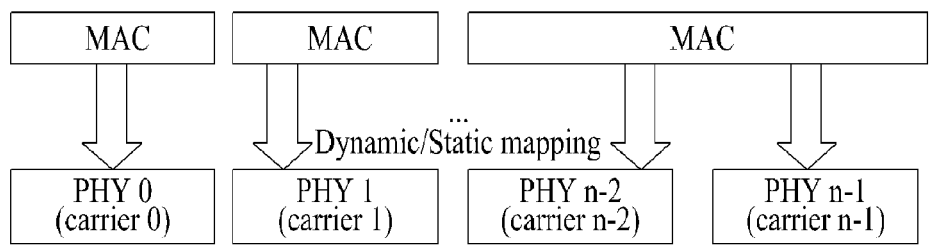
FIG. 8A is a conceptual diagram illustrating multiple carriers of a base station (BS).
Figure 8B:
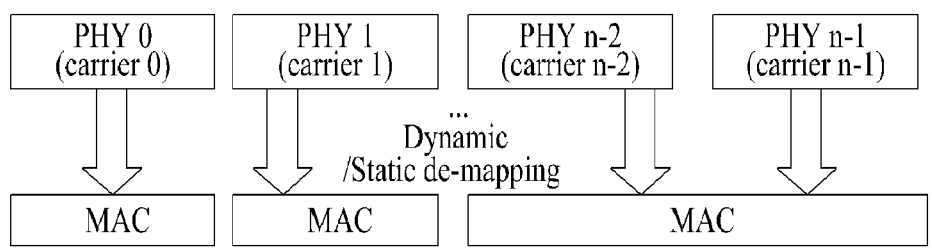
FIG. 8B is a conceptual diagram illustrating multiple carriers of a mobile station (MS).

As shown in FIGS. 7A and 7B, each carrier may be controlled by each MAC layer in one-to-one correspondence and, as shown in FIGS. 8A and 8B, each carrier may be controlled by each MAC layer in one-to-one correspondence with respect to some carriers and one or more carriers may be controlled by one MAC layer with respect to the remaining carriers.

The above system includes a plurality (1 to N) of carriers and may contiguously or non-contiguously use carriers, regardless of an uplink and a downlink. A TDD system is configured to manage N carriers while including DL and UL transmission in carriers and a FDD system is configured to use a plurality of carriers in an uplink/downlink. In the existing LTE Rel-8, although the bandwidths of the uplink and downlink may be differently set, transmission/reception within a single carrier is basically supported. However, in the LTE-A system, as described above, a plurality of carriers may be managed through carrier aggregation. In addition, in the FDD system, asymmetric carrier aggregation in which the uplink and the downlink are different in view of the number of aggregated carriers and/or the bandwidth of the carrier may be supported.

Carrier aggregation (CA) may be comprised of component carriers (CCs)/cells (hereinafter referred to as only 'CCs' for convenience of description) contained in an intra band, or may be comprised of aggregations of component carriers (CCs) between inter bands. In the related art, only one UL timing adjustment (UL TA) is established irrespective of CA configuration. In this case, UL TA may adjust an uplink (UL) Tx time point per MS in such a manner that Tx signals of all UEs contained in the cell can arrive at the BS at the same time point from the viewpoint of BS. However, it may be difficult to establish only one UL TA due to a difference in frequency characteristics between inter bands. In addition, assuming that multiple TA groups are supported in consideration of the above-mentioned situation, it may be possible to use multiple primary cells (PCells), and one PCell may exist, and the PCell may be comprised of a TA group composed of SCells different from those of a TA group of PCell. In this case, the TA group may indicate a set of UL resources sharing the same TA value. One TA group may be comprised of only one serving cell. The relationship between the configured CC and the TA group must be defined by the BS. One TA group is composed of one or more cell/component carriers (CCs). If one or more PCells are present, the UE can simultaneously transmit as many PUCCHs as the number of PCells. In case of FDD, PCell is conceptually comprised of linked or paired DL/UL cells/CCs (hereinafter referred to as only cells). In this case, from the viewpoint of power control, the number of DL cells configured to estimate a DL pathloss must be increased by the number of DL PCells. The UE may calculate the DL pathloss by measuring a Reference Signal Received Power (RSRP) of a configured DL PCell, and may use the calculated DL pathloss for UL power control. The UE must estimate RSRP/RSRQ for each configured PCell, and must report the estimated RSRP/RSRQ to the BS.

The related art has been designed on the basis of one TA and one PCell, such that associated problems may occur under the condition that multiple TAs are supported. In addition, in the case where PCell transmits a preamble/sequence indicating a random access signal and at the same time SCell transmits a PUSCH/SRS under the CA situation instead of multiple TA situations, a power control method for solving the above case and a detailed method for solving associated situations are not present.

Therefore, assuming that multiple TA groups are formed in a system for supporting carrier aggregation (CA), a primary cell (PCell) may be present per TA group, or not present per TA group. One or more cells/CCs are contained in one TA group. Another case in which multiple TA groups are present, PCell is present only in a specific TA group, and another TA group is composed of only SCells may be used. In the case where a random access signal including a preamble is transmitted per TA group so as to support TA, random access signals of individual TA groups may be simultaneously transmitted or may be transmitted at intervals of a predetermined time. If the random access signals of individual TA groups are transmitted at intervals of a predetermined time, UL transmission (PUCCH/PUSCH/SRS) of a first TA group and a random access signal transmitted from a second TA group can be simultaneously transmitted. If the sum of simultaneously-transmitted powers of the MS exceeds a maximum Tx power level, the following method may be considered.

A first method is designed to allocate Tx power by priority between Tx signals. That is, as Tx power is located closer to the leftmost side, the priority is gradually increased. The priority of UL Tx signal may correspond to any one of the following eleven schemes. The Tx signal may be any one of a random access signal, a physical uplink control channel (PUCCH), a physical uplink shared channel (PUSCH) with uplink control information (UCI), and PUSCH without UCI. The priorities needed for simultaneous transmission of such Tx signals are as follows.

1. Random Access Signal>PUCCH>PUSCH with UCI>PUSCH
2. (Random Access Signal=PUCCH)>PUSCH with UCI>PUSCH
3. PUCCH>Random Access Signal>PUSCH with UCI>PUSCH
4. PUCCH>PUSCH with UCI>Random Access Signal>PUSCH
5. PUCCH>PUSCH with UCI>PUSCH>Random Access Signal
6. Random Access Signal>SRS
7. If an arbitrary TA group is activated and an additional TA group attempts to random access, PUCCH is simultaneously transmitted to other TA groups and no channel signals are simultaneously transmitted.
8. PUSCH for Message 3>PUCCH>PUSCH with UCI>PUSCH
9. PUSCH for Message 3=PUCCH>PUSCH with UCI>PUSCH
10. PUCCH>PUSCH for Message 3>PUSCH with UCI>PUSCH
11. PUCCH>PUSCH with UCI>PUSCH for Message 3>PUSCH For example, according to the first scheme, assuming that Tx power is allocated according to "Random Access Signal>PUCCH>PUSCH with UCI>PUSCH without UCI" indicating first priority, a power control equation for PRACH, PUCCH, and PUSCH is as follows.

FIG. 9 is a conceptual diagram illustrating simultaneous transmission of UL signals according to one embodiment.

Referring to FIG. 9, an exemplary case in which PUCCH and PUSCH are transmitted in PCell, PUSCH is transmitted in SCell_1, and PRACH is transmitted in SCell_2 under the communication environment including TA group 1 including PCell and SCell_1 and a TA group 2 including TA group 1 and SCell_2 will hereinafter be described in detail for convenience of description.

In this case, Tx power of PRACH in SCell_2 contained in TA group 2 is represented by the following equation 1 or 2.

[Equation 1]
$$P_{PRACH}(i) = \min \begin{Bmatrix} P_{CMAX,c}(i), \\ PREAMBLE\_RECEIVED\_TARGET\_POWER_c + PL_c \end{Bmatrix}$$
[dBm]

[Equation 2]
$$P_{PRACH}(i) = \min \begin{Bmatrix} P_{CMAX,c}(i), \\ PREAMBLE\_RECEIVED\_TARGET\_POWER + \\ PL_c + \Delta P_{Ramp\text{-}Up\_for\_reference\_TA\_group} \end{Bmatrix}$$
[dBm]

Referring to Equations 1 and 2, $P_{CMAX,c}$ may indicate maximum power capable of being transmitted from the MS configured in the serving cell (c), "PREAMBLE_RECEIVED_TARGET_POWER" may denote reception (Rx) power of an RACH preamble to be used as an object of the BS. PL, may denote a downlink pathloss (or signal loss) calculated in units of dB by a mobile station (MS) of a specific cell index (c), and is represented by "PL=referenceSignalPower–higher layer filteredRSRP".

In Equations 1 and 2, "PREAMBLE_RECEIVED_TARGET_POWER" may be changed to PREAMBLE_RECEIVED_TARGET_POWER$_{TA\_group\_index}$ for each TA group, and the above information is transferred to the MS through higher layers of individual TA groups, or is TA-group-specifically or UE-specifically transferred to the MS. Alternatively, a method for indicating a signaled value using only one value or a method for indicating the signaled value per serving cell may be used as necessary.

$PL_c$ may denote information regarding a reference cell for estimating pathless per TA group, and can be commonly used by a method for informing the MS through higher layer signaling or a method for estimating pathloss of one reference downlink (DL) cell.

In Equation 2, PRACH initial Tx power of the next TA group may be used on the basis of successful PRACH Tx power of a reference TA group. In Equation 2, "PREAMBLE_RECEIVED_TARGET_POWER" is used by the reference TA group and is used to signal one value through a higher layer, the value used in the reference TA group may be reused as PLc, and the pathloss value of the corresponding TA group may be used without change. There is a need to indicate information of a reference DL cell for estimating pathloss per TA group. $\Delta P_{Ramp\text{-}Up\_for\_reference\_TA\_group}$ is total ramp-up power ranging from a first preamble used in the reference TA group to the last preamble.

Equation 3 may denote PUCCH Tx power of a PUCCH transmission cell from among serving cells of the TA group 1. In this case, the serving cell may be a primary cell (PCell). If the serving cell indicates multiple PCells, an index must be added in the same manner as in PPUCCH,c.

[Equation 3]
$$P_{PUCCH}(i) = \min$$
$$\begin{Bmatrix} 10\log_{10}(\hat{P}_{CMAX,c}(i) - \hat{P}_{PRACH}(i)), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}$$
[dBm]

Referring to Equation 3, $\hat{P}_{PRACH}(i)$ is a linear value of $P_{PRACH}(i)$, and $\hat{P}_{CMAX,c}(i)$ is a linear value of $P_{CMAX,c}(i)$.

In Equation 3, "i" denotes a subframe index, $P_{CMAX,c}$ denotes maximum power capable of being transmitted from the MS of a specific cell index (c), $P_{O\_PUCCH,c}$ is a parameter composed of the sum of cell-specific parameters and is indicated through higher layer signaling, and PL denotes a DL pathloss (or signal loss) calculated in units of dB by the MS, and may be represented by "PL=referenceSignalPower–higher layer filteredRSRP". $h(n_{CQI}, n_{HARQ}, n_{SR})$ is dependent upon a PUCCH format, where $n_{CQI}$ is the number of information bits of CQI, and $n_{HARQ}$ is the number of HARQ bits in a specific subframe. If a specific subframe is composed of an SR of the MS including no transport block (TB) related to UL-SCH, $n_{SR}$ is set to 1. If the specific subframe is not composed of the SR of the MS, $n_{SR}$ is set to 0.

$\Delta_{F\_PUCCH}$ (F) is a relative value of PUCCH format 1 a, corresponds to PUCCH format (F), and is indicated through higher layer signaling by the BS. g(i) is a current PUCCH power control adjustment state of the subframe (i). Here, $n_{CQI}$ is the number of information bits of CQI in a specific subframe, and $n_{HARQ}$ is the number of HARQ bits in a specific subframe. If a specific subframe is composed of an SR of the MS including no transport block (TB) related to UL-SCH, $n_{SR}$ is set to 1. If the specific subframe is not composed of the SR of the MS, $n_{SR}$ is set to 0. $\Delta_{TxD}(F')$ is transmitted when PUCCH is transmitted through two antenna ports. If $\Delta_{TxD}(F')$ is configured by the MS, $\Delta_{TxD}(F')$ is determined by a higher layer in which each PUCCH format F' is defined.

Equation 4 represents PUSCH transmit (Tx) power of a serving cell, in which PUCCH and PUSCH are not simultaneously transmitted, from among cells of TA group 1.

[Equation 4]
$$P_{PUSCH,c}(i) = \min$$
$$\begin{Bmatrix} 10\log_{10}(\hat{P}_{CMAX,c}(i) - \hat{P}_{PRAH}(i)), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$
[dBm]

Referring to FIG. 4, $P_{CMAX,c}$ may denote maximum power capable of being transmitted by the MS of a specific cell index (c). $M_{PUSCH,c}(i)$ is a parameter indicating a PUSCH resource allocation bandwidth represented by the number of valid resource blocks of the specific cell index (c) in association with the subframe index (i), and is allocated by the BS. $P_{O\_PUSCH,c}(j)$ is a parameter which is composed of the sum of a cell-specific nominal component $P_{O\_NOMINAL\_PUSCH,c}(j)$ received from a higher layer of the specific cell index (c) and a UE-specific component $P_{O\_UE\_PUSCH,c}(j)$ received from a higher layer. The BS may inform the MS of $P_{O\_PUSCH,c}$ (j). $\alpha_c(j)$ is provided from a higher layer of the specific cell index (c), and is a cell-specific parameter transmitted by the BS using 3 bits. If j=0 or j=1, a is denoted by $\alpha \in \{0, 0.4, 0.5, 0.6,$ 0.7, 0.8, 0.9, 1}. If j=2, α(j) is set to 1 (where α(j)=1). $α_c$(j) is notified from the BS to the MS. PL, may denote an estimation value of DL pathloss (or signal loss) calculated in units of dB by the MS of the specific cell index (c), and may be denoted by "$PL_c$=referenceSignalPower−higher layer filteredRSRP", where "referenceSignalPower" may be notified from the BS to the MS through higher layer signaling. $f_c$(i) may denote a current PUSCH power control adjustment state of the subframe index (i) of the specific cell index (c), and may be represented by a current absolute value or accumulation value.

$Δ_{TF_c}$(i) defined in 3GPP LTE/LTE-A is basically set to a value of one codeword of the specific cell index (c). In association with a specific codeword index, assuming that $K_S$=1.25 is established, $Δ_{TF}$(i)=10 $\log_{10}((2^{MPR \cdot K_S}−1) β_{offset}^{PUSCH})$ is established. Assuming that $K_S$=0 is established, $Δ_{TF}$(i)=0 is established. Ks may be a UE-specific parameter "deltaMCS-Enabled" applied to each codeword from the BS to the MS through a higher layer. Assuming that $K_S$=0 is established, $Δ_{TF}$(i) may be set to zero (i.e., $Δ_{TF}$(i)=0), such that individual codewords have the same Tx power. However, assuming that $K_S$=1.25 is established, individual codewords may have different Tx powers according to the Tx information size (or the scheduled MCS level) normalized by allocation resources of each codeword. In this case, the parameter (MPR) may also be referred to as another parameter "Bits Per Resource Element (BPRE)" or the like. That is, assuming that Ks is not set to zero, $Δ_{TF_c}$(i) may be generated on the basis of the amount of information (e.g., BPRE) of a unit resource of each codeword.

In accordance with the embodiments of the present invention, $Δ_{TF_c}$(i) may be indicated through higher layer signaling in such a manner that °C. (U) is established per TA group, and may be cell-specifically or UE-specifically indicated. In addition, reference DL cell information may be indicated through higher layer signaling, or may be cell-specifically or UE-specifically indicated, such that $PL_c$ can be estimated by individual TA groups in different ways. Alternatively, irrespective of a TA group, the above two elements may be used as one common value as necessary.

If PUCCH (re)transmission is carried out by a random access response grant (if j=2), $P_{O\_UE\_PUSCH,c}$(2) and $P_{O\_NOMINAL\_PUSCH,c}$(2) of $P_{O\_PUSCH,c}$(j) must be signaled per TA group, and may be indicated through higher layer signaling. Alternatively, a reference TA group is transmitted through higher layer signaling, and a difference value of another TA group may be broadcast or UE-specifically indicated.

PUSCH transmission (Tx) power of the serving cell, in which PUCCH and PUSCH are simultaneously transmitted, from among cells of the TA group 1 is represented by the following equation 5.

[Equation 5]

$$P_{PUSCH,c}(i) = \min \begin{Bmatrix} 10\log_{10}(\hat{P}_{CMAX,c}(i) - \hat{P}_{PRACH}(i) - \hat{P}_{PUCCH}(i)), \\ 10\log_{10}(M_{PUSCH,c}(i)) + P_{O\_PUSCH,c}(j) + α_c(j) \cdot PL_c + Δ_{TF,c}(i) + f_c(i) \end{Bmatrix}$$

[dBm]

Referring to Equation 5, $\hat{P}_{PUCCH}$(i) is a linear value of $P_{PUCCH}$(i), may be indicated through higher layer signaling in such a manner that $α_c$(j) is established per TA group, or may be TA-group-specifically or UE-specifically indicated.

In addition, reference DL cell information may be indicated through higher layer signaling, or may be cell-specifically or UE-specifically indicated, such that $PL_c$ can be estimated by individual TA groups in different ways. Alternatively, irrespective of a TA group, the above two elements may be used as one common value as necessary.

If PUCCH (re)transmission is carried out by a random access response grant (if j=2), $P_{O\_UE\_PUSCH,c}$(2) and $P_{O\_NOMINAL\_PUSCH,c}$(2) of $P_{O\_PUSCH,c}$(j) must be signaled per TA group, and may be indicated through higher layer signaling. Alternatively, a reference TA group is transmitted through higher layer signaling, and a difference value of another TA group may be broadcast or UE-specifically indicated.

If the example of Tx power configuration is generalized under a specific situation of FIG. 9, the low-priority cases from among the above-mentioned cases having the priorities 1 to 11 can be replaced with other cases obtained when maximum power limitation of the legacy power control equation is reduced by Tx power of the former priorities located before a conventional value.

If the sum of Tx power of PRACH, Tx power of PUSCH including PUCCH and UCI, and Tx power of PUSCH including no UCI exceeds maximum Tx power ($\hat{P}_{CMAX}$(i)) of the MS, the MS may adjust each Tx power of each serving cell using the following conditions.

Assuming that PUCCH is transmitted only in one serving cell, and PUCCH and PRACH are simultaneously transmitted, PUCCH transmit (Tx) power can be adjusted using Equations 1 and 3.

Assuming that PUCCH is transmitted in only one serving cell, and PUCCH, PUSCH, PRACH are simultaneously transmitted, PUCCH Tx power can be adjusted to satisfy the following equation 6. Here, another case including no PUCCH transmission may be used. If PUCCH transmission is not used, $\hat{P}_{PUCCH}$(i)=0 may be established. That is, Tx power of PUSCH is obtained when linear values of PRACH and PUCCH Tx powers according to priority are excluded from a linear value of maximum Tx power of the MS, and the scaling factor w(i) is applied to the remaining Tx power, such that PUSCH Tx power can be adjusted.

$$\sum_c w(i) \cdot \hat{P}_{PUSCH,c}(i) \leq (\hat{P}_{CMAX}(i) - \hat{P}_{PRACH}(i) - \hat{P}_{PUCCH}(i))$$ [Equation 6]

Equation 7 represents a condition of Tx power of a PUSCH including UCI, Tx power of PUSCH including no UCI, and Tx power of PUSCH which does not include UCI needed for simultaneous transmission of PRACH. Referring to Equation 7, maximum Tx power of the MS may consider not only a linear value of PRACH Tx power but also a linear value of PUSCH Tx power including UCI, such that Tx power of PUSCH including no UCI can be decided.

$$\sum_{c \neq j} w(i) \cdot \hat{P}_{PUSCH,c}(i) \leq (\hat{P}_{CMAX}(i) - \hat{P}_{PRACH}(i) - \hat{P}_{PUSCH,j}(i))$$ [Equation 7]

In Equations 8 and 9, PUSCH Tx power needed when the serving cell (j) simultaneously transmits a PUCCH and a PUSCH including UCI, the other serving cell transmits a PUSCH including no UCI, and another serving cell transmits a PRACH can satisfy the following equation 8 or 9.

Referring to Equation 9, a maximum Tx power of the MS can determine PUSCH Tx power in consideration of a linear value of PRACH Tx power and a linear value of PUCCH Tx power.

Referring to Equation 9, assuming that PUSCH including UCI is transmitted in another cell, the scaling factor w(i) is applied to Tx power of PUSCH including no UCI in consideration of PUSCH Tx power including UCI, such that PUSCH Tx power can be adjusted.

$$\hat{P}_{PUSCH,j}(i) = \min(\hat{P}_{PUSCH,j}(i), (\hat{P}_{CMAX}(i) - \hat{P}_{PRACH}(i) - \hat{P}_{PUCCH}(i))) \quad \text{[Equation 8]}$$

$$\sum_{c \neq j} w(i) \cdot \hat{P}_{PUSCH,c}(i) \leq (\hat{P}_{CMAX}(i) - \hat{P}_{PRACH}(i) - \hat{P}_{PUCCH}(i) - \hat{P}_{PUSCH,j}(i)) \quad \text{[Equation 9]}$$

Equation 10 can be satisfied when PUCCH is transmitted in one or more serving cells.

$$\sum_c w(i) \cdot \hat{P}_{PUCCH,c}(i) \leq (\hat{P}_{CMAX}(i) - \hat{P}_{PRACH}(i)) \quad \text{[Equation 10]}$$

$$\sum_c \hat{P}_{PUCCH,c}(i)$$

Referring to Equation 10, may correspond to the sum of PUCCH Tx powers in cells to which PUCCH is allocated. That is, the sum of PUCCH Tx powers of individual cells can satisfy a specific condition in which the sum of PUCCH Tx powers does not exceed a difference in linear value between maximum Tx power of the MS and the PRACH Tx power.

Equation 11 may represent a specific condition in which PUSCH Tx power needs to be satisfied when PUCCH, PUSCH, and PRACH are simultaneously transmitted.

$$\sum_c w(i) \cdot \hat{P}_{PUSCH,c}(i) \leq (\hat{P}_{CMAX}(i) - \hat{P}_{PRACH}(i) - \sum \hat{P}_{PUCCH}(i)) \quad \text{[Equation 11]}$$

Referring to Equation 11, $\Sigma \hat{P}_{PUCCH}(i)$ is the sum of PUCCH Tx powers in cells to which PUCCH is allocated, and $$\sum_c \hat{P}_{PUSCH,c}(i)$$

is the sum of PUSCH Tx powers in cells to which PUSCH is allocated.

An exemplary case in which PUSCH including UCI, PUSCH including no UCI, and PRACH are simultaneously transmitted can satisfy the following equation 12.

$$\sum_{c \neq j} w(i) \cdot \hat{P}_{PUSCH,c}(i) \leq (\hat{P}_{CMAX}(i) - \hat{P}_{PRACH}(i) - \hat{P}_{PUSCH,j}(i)) \quad \text{[Equation 12]}$$

An exemplary case in which a PUCCH and a PUSCH including UCI are simultaneously transmitted in the serving cell (j), a PUSCH including no UCI is transmitted in the other serving cell, and a PRACH is transmitted in another serving cell can satisfy the following equations 13 and 14.

$$\hat{P}_{PUSCH,j}(i) = \min(\hat{P}_{PUSCH,j}(i), (\hat{P}_{CMAX}(i) - \hat{P}_{PRACH}(i) - \sum \hat{P}_{PUCCH}(i))) \quad \text{[Equation 13]}$$

$$\sum_{c \neq j} w(i) \cdot \hat{P}_{PUSCH,c}(i) \leq (\hat{P}_{CMAX}(i) - \hat{P}_{PRACH}(i) - \sum \hat{P}_{PUCCH}(i) - \hat{P}_{PUSCH,j}(i)) \quad \text{[Equation 14]}$$

Referring to Equation 13, PUSCH Tx power including UCI may consider the maximum Tx power of the MS and a linear value of PRACH Tx power, and may be determined in consideration of linear values of multiple PUCCH Tx powers.

Referring to Equation 14, PUSCH Tx power including UCI may consider the maximum Tx power of the MS and a linear value of PRACH Tx power, and may be determined in consideration of linear values of multiple PUCCH Tx powers and a linear value of PUSCH Tx power including multiple UCIs. That is, each PUSCH Tx power can be adjusted using a proportional constant w(i) in such a manner that PUSCH Tx power including UCI can satisfy the Equation 14.

The above priority method 2-11 can be extended in the same manner as described above, and can also be used in the same manner as in Method 1 according to priorities between respective signals.

If Tx power is allocated by the priority method 5, power control equations of PRACH and SRS are shown in the following equations 15 and 16.

Equation 15 or 16 may represent PRACH Tx power.

$$P_{PRACH}(i) = \min \begin{Bmatrix} P_{CMAX,c}(i), \\ \text{PREAMBLE\_RECEIVED\_TARGET\_POWER}_c + PL_c \end{Bmatrix} [dBm] \quad \text{[Equation 15]}$$

$$P_{PRACH}(i) = \min \begin{Bmatrix} P_{CMAX,c}(i), \\ \text{PREAMBLE\_RECEIVED\_TARGET\_POWER} + PL_c + \Delta P_{Ramp\_Up\_for\ reference\_TA\_group} \end{Bmatrix} [dBm] \quad \text{[Equation 16]}$$

In this case, "PREAMBLE_RECEIVED_TARGET_POWER$_{TA\_group\_index}$" may be transferred per TA group through higher layer signaling, may be TA-group-specifically or UE-specifically transferred to the MS, may be signaled through one value, or may be signaled to each serving cell.

When information of a reference cell for estimating a pathloss for each TA group is transferred to the MS through higher layer signaling, or when the passloss of only one reference DL cell is estimated, $PL_c$ can be commonly used.

Equation 2 may represent the exemplary case in which PRACH initial Tx power of the next TA group is used on the basis of successful PRACH Tx power of the reference TA group. In Equation 2, "PREAMBLE_RECEIVED_TARGET_POWER" may denote a specific value used in the reference TA group, and only one value of "PREAMBLE_RECEIVED_TARGET_POWER" is signaled through a higher layer. PLc may be reused as a value used in the reference TA group, or may use the pathloss value of the corresponding TA group. Information of a reference downlink cell for estimating the pathloss for each TA group must be indicated. $\Delta P_{Ramp-Up\_for\_reference\_TA\_group}$ is total ramp-up power ranging from a first preamble used in the reference TA group to the last preamble.

Equation 17 may denote SRS Tx power. In this case, according to priorities of individual channels in relation to SRS Tx power, SRS Tx power can be determined in consideration of a linear value of PRACH Tx power.

$$P_{SRS,c}(i) = \min \begin{Bmatrix} 10\log_{10}(\hat{P}_{CMAX,c}(i) - \hat{P}_{PRACH}(i)), \\ P_{SRS\_OFFSET,c}(m) + 10\log_{10}(M_{SRS,c}) + P_{O\_PUSCH,c}(j) + \alpha_c(j) \cdot PL_c + f_c(i) \end{Bmatrix}$$

[Equation 17]

[dBm]

Referring to Equation 17, 'i' may denote a subframe index, and $P_{SRS,c}(i)$ is SRS power transmitted in the subframe (i) of the specific cell index (c). $P_{SRS\_OFFSET,c}(m)$, $M_{SRS,c}$, and $P_{O\_PUSCH,c}(j)$, $\alpha_c(j)$ may be notified from the SB to the MS through higher layer signaling, and $f_c(i)$ is dynamically notified from the BS of a specific cell index (c) to the MS through a TPC command of a PDCCH. $P_{SRS\_OFFSET,c}(m)$ is a UE-specific parameter (for example, 4 bits) indicating a power offset value for SRS transmission of the specific cell index (c), is semi-statically configured in a higher layer, and is signaled from the BS to the MS. $M_{SRS,c}$ may denote the SRS transmission bandwidth denoted by the number of resource blocks, and $f_c(i)$ may denote a specific value indicating a current PUSCH power control adjustment state and be represented by a current absolute value or accumulation value. $\alpha_c(j)$ is a cell-specific parameter capable of being transmitted from the BS using 3 bits in a higher layer of the specific cell index (c). If j=0 or 1, $\alpha_c$ may be denoted by $\alpha_c \in \{0, 0.4, 0.5, 0.6, 0.7, 0.8, 0.9, 1\}$. If j=2, $\alpha_c(j)$ may be denoted by $\alpha_c(j)=1$ that is notified from the BS to the MS.

$P_{CMAX,c}(i)$ may denote maximum transmittable power of the MS of the specific cell index (c), and $M_{SRS,c}$ may denote the SRS transmission bandwidth in the subframe (i) denoted by the number of resource blocks of the specific cell index (c). $P_{O\_PUSCH,c}(j)$ is a parameter composed of the sum of a cell-specific nominal component $P_{O\_NOMINAL\_PUSCH,c}(j)$ provided from a higher layer of the specific cell index (c) and a UE-specific component $P_{O\_UE\_PUSCH,c}(j)$ provided from a higher layer of the specific cell index (c), and is notified from the BS to the MS.

$PL_c$ may denote a DL pathloss (or signal loss) estimation value calculated in units of dB by the UE of the specific cell index (c), and may be represented by $PL_c$=referenceSignalPower−higher layer filteredRSRP. The BS may discriminate between periodic SRS transmission and aperiodic SRS transmission, and may separately inform the MS of $P_{SRS\_OFFSET,c}(m)$. For example, 'trigger type 0' may denote 'm=0', and the BS may inform the UE of a power offset value for aperiodic SRS transmission through higher layer signaling. In addition, 'trigger type 1' may denote 'm=1', and the BS may inform the MS of a power offset value for aperioric SRS transmission through higher layer signaling.

Assuming that the sum of Tx power of PRACH and Tx power of SRSs exceeds maximum Tx power ($P_{CMAX}(i)$) of the MS, the MS may adjust $\hat{P}_{SRS,c}(i)$ of each serving cell using the following equation 18. In the same manner as in Equation 17, in association with SRS Tx power, the sum of Tx powers can be determined in consideration of a linear value of PRACH Tx power according to priorities of individual channels.

$$\sum_{c \neq k} w(i) \cdot \hat{P}_{SRS,c}(i) \leq (\hat{P}_{CMAX}(i) - \hat{P}_{PRACH}(i))$$

[Equation 18]

In this case, $\hat{P}_{SRS,c}(i)$ may denote a linear value of $\hat{P}_{SRS,c}(i)$, $\hat{P}_{PRACH}(i)$ may denote a linear value of $P_{PRACH}(i)$, and $\hat{P}_{CMAX}(i)$ may denote a linear value of $\hat{P}_{CMAX}$ defined in the subframe (i). In addition, w(i) may denote a scaling factor of $\hat{P}_{SRS,c}(i)$ for the serving cell (c), where w(i) is denoted by 0<w(i)≤1. In this case, w(i) may have the same value between serving cells.

In addition, assuming that a TPC command of the equation indicating PUCCH/PUSCH is in the accumulation mode in a similar way to the embodiment, and a specific serving cell for each serving cell receives a random access response message in association with reset values of $f_c(i)$ and g(i), the serving cell having received the corresponding message must reset the accumulated TPC command to the value of 0 or a specific value. For example, the accumulated TPC command must be set to a predetermined value or a specific value signaled by the BS.

The following description discloses setting of initial values of the above two elements $f_c(i)$ and g(i).

An initial value of the element $f_c(i)$ configured to decide PUSCH Tx power is established as follows. $f_c(i)$ is a specific value indicating a current PUSCH power control adjustment state of the subframe index (i) of a specific cell index (c), and may be represented by a current absolute value or accumulation value.

If $P_{O\_UE\_PUSCH,c}$ is changed by a higher layer and the serving cell (c) is a primary cell (PCell), or if $P_{O\_UE\_PUSCH,c}$ is received through a higher layer and the serving cell (c) is a secondary cell (SCell), $f_c(0)$ is set to zero (i.e., $f_c(0)$=0).

If $P_{O\_UE\_PUSCH,c}$ is not changed by a higher layer and the serving cell (c) is not identical to a primary cell (PCell), and if $P_{O\_UE\_PUSCH,c}$ is not received through a higher layer and the serving cell (c) is not identical to a secondary cell (SCell), $f_c(0)$ is denoted by $f_c(0)=\Delta P_{rampup}+\delta_{msg2}$. In this case, the serving cell (c) may be configured to transmit PRACH (random access signal) in each TA group. $\delta_{msg2}$ may denote a TPC command received from the random access response message transmitted for the serving cell configured to transmit PRACH for each TA group. $\Delta P_{rampup}$ is provided from a higher layer, and may denote total ramp-up power ranging from the first preamble to the last preamble.

An initial value of the element g(i) for determining PUCCH Tx power is established. g(i) may denote a current PUCCH power control adjustment state of the subframe (i).

If $P_{O\_UE\_PUSCH,c}$ is changed by a higher layer, the initial value of the element g(i) is set to g(0)=0.

However, assuming that $P_{O\_UE\_PUSCH,c}$ is not changed by a higher layer, the initial value is denoted by $g(0)=\Delta P_{rampup}+\delta_{msg2}$. In this case, $\delta_{msg2}$ is a TPC command received from the random access response message transmitted for the serving cell having transmitted PRACH to each TA group, and $\Delta P_{rampup}$ is total ramp-up power ranging from a first preamble to the last preamble after being provided from a higher layer.

Although the above-mentioned embodiment has disclosed the situation encountered in multiple TA groups, it should be noted that the above method can also be applied to another situation in which the timing advance scheme is used as in 3GPP LTE Release-10.

For example, assuming that PUSCH/SRS transmission is achieved in PCell and SCell(s) configured to transmit the random access preamble, the power distribution problem caused by the above simultaneous transmission and another power control problem caused by a TA group may occur, and the proposed schemes can be applied to the embodiment. The random access preamble may be transmitted to guarantee UL synchronization in PCell. That is, the random access preamble may be transmitted for either UE positioning or scheduling request. Of course, another case in which the random access preamble is transmitted for synchronization acquisition is not excluded from the scope of the present invention.

In addition, the random access preamble transmitted after UL synchronization acquisition is limited to PRACH format/signaling configured to use one subframe (having 1 ms or less). PRACH format is classified into various formats according to the size of cell (or the radius of cell). Since a subframe of 2 ms and a subframe of 3 ms (i.e., 3 subframes) are also present, the above subframes are appropriate for time synchronization, but reusing of the above subframes is not greatly beneficial to the next case after completion of such time synchronization.

That is, a factor value of each Tx power can be adjusted on the basis of TA group in such a manner that synchronization adjustment is possible.

In association with priority of each transmission (Tx) channel, Tx power can be calculated by assigning priority to RACH. Therefore, if channels are simultaneously transmitted in individual cells contained in multiple TA groups, it may be possible to establish UL Tx power of the MS.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

Industrial Applicability

As is apparent from the above description, the BS device for controlling transmit (Tx) power and a method for the same according to the embodiments of the present invention can be applied to various mobile communication systems, for example, 3GPP LTE, LTE-A, IEEE 802, and the like.

The invention claimed is:

1. A method of controlling transmission powers for transmission of a plurality of channels by a user equipment in a wireless communication system supporting a plurality of component carriers, the method comprising:
    determining a transmission power of a physical random access channel (PRACH) for a PRACH transmission on a first component carrier belonging to a first timing advance group; and
    determining a transmission power of a physical uplink control channel (PUCCH) for a PUCCH transmission on a second component carrier belonging to a second timing advance group,
    wherein the determining the PUCCH transmission power comprises:
        if the PRACH transmission on the first component carrier belonging to the first timing advance group overlaps with the PUCCH transmission on the second component carrier belonging to the second timing advance group with respect to time, and if a total of the determined PRACH transmission power and the PUCCH transmission power exceeds a maximum transmission power configured for the user equipment, adjusting only the PUCCH transmission power.

2. The method of claim 1, further comprising:
    transmitting the PRACH on the first component carrier belonging to the first timing advance group based on the determined PRACH transmission power; and
    transmitting the PUCCH on the second component carrier belonging to the second timing advance group based on the adjusted PUCCH transmission power.

3. The method of claim 1, wherein the first component carrier corresponds to a secondary component carrier.

4. The method of claim 1, wherein the second component carrier corresponds to a second secondary carrier or a primary component carrier.

5. The method of claim 1, wherein the user equipment is configured with a plurality of timing advance groups including the first timing advance group and the second timing advance group.

6. The method of claim 1,
    wherein determining the PUCCH transmission power comprises:
        maintaining the determined PRACH transmission power while adjusting the PUCCH transmission power if the PRACH transmission on the first component carrier belonging to the first timing advance group overlaps with the PUCCH transmission on the second component carrier belonging to the second timing advance group with respect to time, and if the total of the determined PRACH transmission power and the PUCCH transmission power exceeds the maximum transmission power configured for the user equipment.

7. The method of claim 1,
wherein the PRACH transmission on the first component carrier belonging to the first timing advance group overlaps with the PUCCH transmission on the second component carrier belonging to the second timing advance group with respect to time when the PRACH transmission and the PUCCH transmission are scheduled on a same subframe.

8. A user equipment for controlling transmission powers for transmission of a plurality of channels in a wireless communication system supporting a plurality of component carriers, the user equipment comprising:
a transmitter; and
a processor operatively connected to the transmitter and configured to:
determine a transmission power of a physical random access channel (PRACH) for a PRACH transmission on a first component carrier belonging to a first timing advance group; and
determine a transmission power of a physical uplink control channel (PUCCH) for a PUCCH transmission on a second component carrier belonging to a second timing advance group, wherein the processor is further configured to determine either the PUCCH transmission power by:
if the PRACH transmission on the first component carrier belonging to the first timing advance group overlaps with the PUCCH transmission on the second component carrier belonging to the second timing advance group with respect to time and a total of the determined PRACH transmission power and the PUCCH transmission power exceeds a maximum transmission power configured for the user equipment, adjusting only the PUCCH transmission power.

9. The user equipment of claim 8, further comprising wherein the transmitter is configured to:
transmit the PRACH on the first component carrier belonging to the first timing advance group based on the determined PRACH transmission power; and
transmit the PUCCH on the second component carrier belonging to the second timing advance group based on the adjusted PUCCH transmission power.

10. The user equipment of claim 8, wherein the first component carrier corresponds to a secondary component carrier.

11. The user equipment of claim 8, wherein the second component carrier corresponds to a second secondary carrier or a primary component carrier.

12. The user equipment of claim 8, wherein the user equipment is configured with a plurality of timing advance groups including the first timing advance group and the second timing advance group.

13. The user equipment of claim 8,
wherein the processor is further configured to determine the PUCCH transmission power by:
maintaining the determined PRACH transmission power while adjusting the PUCCH transmission power if the PRACH transmission on the first component carrier belonging to the first timing advance group overlaps with the PUCCH transmission on the second component carrier belonging to the second timing advance group with respect to time and the total of the determined PRACH transmission power and the PUCCH transmission power exceeds the maximum transmission power configured for the user equipment.

14. The user equipment of claim 8,
wherein the PRACH transmission on the first component carrier belonging to the first timing advance group overlaps with the PUCCH transmission on the second component carrier belonging to the second timing advance group with respect to time when the PRACH transmission and the PUCCH transmission are scheduled on a same subframe.

* * * * *